United States Patent
Benoit et al.

(10) Patent No.: US 11,223,715 B2
(45) Date of Patent: *Jan. 11, 2022

(54) SHORT RANGE WIRELESS LOCATION/MOTION SENSING DEVICES AND REPORTING METHODS

(71) Applicant: WEARSAFE LABS LLC, Hartford, CT (US)

(72) Inventors: David B. Benoit, West Hartford, CT (US); Phillip A. Giancarlo, Lebanon, CT (US)

(73) Assignee: WEARSAFE LABS LLC, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/739,475

(22) PCT Filed: Jan. 22, 2016

(86) PCT No.: PCT/US2016/014514
§ 371 (c)(1),
(2) Date: Dec. 22, 2017

(87) PCT Pub. No.: WO2016/118856
PCT Pub. Date: Jul. 28, 2016

(65) Prior Publication Data
US 2018/0332156 A1 Nov. 15, 2018

Related U.S. Application Data

(63) Continuation of application No. 15/003,544, filed on Jan. 21, 2016, now Pat. No. 9,813,535.
(Continued)

(51) Int. Cl.
*H04M 1/2749* (2020.01)
*H04W 4/90* (2018.01)
(Continued)

(52) U.S. Cl.
CPC ..... *H04M 1/2749* (2020.01); *H04M 1/72412* (2021.01); *H04W 4/90* (2018.02);
(Continued)

(58) Field of Classification Search
CPC ......... H04M 1/274575; H04M 1/7253; H04W 4/90
(Continued)

(56) References Cited

U.S. PATENT DOCUMENTS 8,624,727 B2 1/2014 Saigh
8,907,772 B1* 12/2014 Green ................... G07C 5/008
340/438
(Continued)

FOREIGN PATENT DOCUMENTS

CN 104077898 A 10/2014
WO WO2007042433 4/2007

OTHER PUBLICATIONS

PCT International Search Report—PCTUS1614521 ISR.
(Continued)

*Primary Examiner* — Kerri L McNally
(74) *Attorney, Agent, or Firm* — John M. Behles

(57) ABSTRACT

Short range wireless location and motion sensing devices and reporting methods are provided herein. An example device includes a housing configured to couple with a power port of a vehicle. The housing includes a wireless interface, a motion sensor that senses at least one of velocity, acceleration, and orientation of the vehicle, a processor and a memory that stores logic that is executed by the processor to receive motion signals from the motion sensor and transmit the motion signals on the wireless interface to a mobile device that is communicatively coupled with the wireless adapter.

13 Claims, 7 Drawing Sheets

Related U.S. Application Data

(60) Provisional application No. 62/107,205, filed on Jan. 23, 2015.

(51) Int. Cl.
*H04M 1/72412* (2021.01)
*B60R 21/00* (2006.01)
*H04M 1/60* (2006.01)
*H04M 1/72418* (2021.01)
*H04M 1/72457* (2021.01)

(52) U.S. Cl.
CPC ... *B60R 2021/0027* (2013.01); *H04M 1/6075* (2013.01); *H04M 1/72418* (2021.01); *H04M 1/72457* (2021.01)

(58) Field of Classification Search
USPC ....................................... 340/425.5
See application file for complete search history.

(56) References Cited

U.S. PATENT DOCUMENTS

| | | | |
|---|---|---|---|
| 9,813,535 B2* | 11/2017 | Benoit | .................. H04W 4/90 |
| 2004/0070515 A1 | 4/2004 | Burkley | |
| 2005/0234727 A1 | 10/2005 | Chiu | |
| 2006/0267783 A1 | 11/2006 | Smith | |
| 2007/0057798 A1 | 3/2007 | Li et al. | |
| 2007/0262857 A1 | 11/2007 | Jackson | |
| 2008/0172232 A1 | 7/2008 | Gurley | |
| 2008/0195261 A1* | 8/2008 | Breed | ................ B60R 21/0132 701/2 |
| 2009/0256690 A1 | 10/2009 | Golenski | |
| 2009/0325535 A1 | 12/2009 | Feit | |
| 2010/0001057 A1 | 1/2010 | Huelbusch | |
| 2010/0048194 A1 | 2/2010 | Park | |
| 2010/0107192 A1 | 4/2010 | Sennett | |
| 2010/0161338 A1 | 6/2010 | Tofighbakhsh | |
| 2011/0248863 A1 | 10/2011 | Johnson | |
| 2011/0316698 A1 | 12/2011 | Palin | |
| 2013/0226369 A1 | 8/2013 | Yorio | |
| 2014/0094210 A1 | 4/2014 | Gellens et al. | |
| 2014/0191873 A1 | 7/2014 | Kreiner | |
| 2014/0297100 A1 | 10/2014 | Miura | |
| 2014/0300739 A1 | 10/2014 | Mimar | |
| 2014/0370836 A1 | 12/2014 | Gladstone | |
| 2014/0370837 A1 | 12/2014 | Gladstone | |
| 2015/0137972 A1 | 5/2015 | Nepo | |

OTHER PUBLICATIONS

PCT International Search Report—PCTUS1614514 ISR.
European Search Report—EP 16 74 0830.
EPO Office Action—EP 16 74 0830.
EPO Search Strategy—EP 16 74 0830.
EPO Examination Report dated Jul. 29, 2019.
First Office Action, Issue Serial No. 2019092601858500, Advance China IP Law Office.

* cited by examiner

SHORT RANGE WIRELESS LOCATION/MOTION SENSING DEVICES AND REPORTING METHODS

CROSS-REFERENCE TO RELATED APPLICATIONS

This application is a § 371 National Stage Entry of PCT/US2016/014514, filed on Jan. 22, 2016, which is a continuation of U.S. Pat. No. 9,813,535, issued on Nov. 7, 2017, which claims the benefit and priority of U.S. Provisional Application Serial No. 62/107,205, filed on Jan. 23, 2015, each of which is hereby incorporated by reference herein in its entirety including all references and appendices cited therein, for all purposes.

FIELD OF THE PRESENT DISCLOSURE

The present disclosure pertains to wireless adapters and motion sensing technologies, and more specifically, but not by limitation, to systems and methods that provide short range wireless location and motion sensing, as well as reporting and device activation procedures.

SUMMARY

According to some embodiments, the present disclosure is directed to a wireless adapter, comprising: (a) a housing configured to couple with a power port of a vehicle, the housing comprising: (i) a wireless interface; (ii) a motion sensor that senses at least one of velocity, acceleration, and orientation; (iii) a processor; and (iv) a memory that stores logic that is executed by the processor to: (1) receive motion signals from the motion sensor; and (2) transmit the motion signals on the wireless interface to a mobile device that is communicatively coupled with the wireless adapter.

According to some embodiments, the present disclosure is directed to a system comprising: (a) a wireless adapter comprising: (i) a wireless interface; (ii) a motion sensor that senses at least one of velocity, acceleration, and orientation; (iii) a processor; and (iv) a memory that stores logic that is executed by the processor to: (1) receive motion signals from the motion sensor; and (2) transmit the motion signals on the wireless interface to a mobile device that is communicatively coupled with the wireless adapter; and (b) the mobile device comprising: (i) a wireless interface; (ii) a mobile device motion sensor that senses at least one of velocity, acceleration, and orientation; (iii) a location sensor that monitors a location of the mobile device; (iv) a processor; and (v) a memory that stores logic that is executed by the processor to: (1) receive the motion signals from the motion sensor of the wireless adapter and mobile device motion signals from the mobile device motion sensor; and (2) transmit the motion signals from the motion sensor of the wireless adapter and the mobile device motion signals from the mobile device motion sensor on the wireless interface to an emergency response server with which the mobile device can communicatively couple.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity having any relationship to the subject matter of the present disclosure.

Generally described, the present disclosure is directed to systems that include wireless adapters, which cooperate with mobile devices, in short range communications, to track the movement of an object associated with the wireless adapter. An example adapter interfaces with a vehicle, such as an automobile, through a direct physical connection with the vehicle in such a way that the wireless adapter does not move relative to the vehicle.

Figure 1:
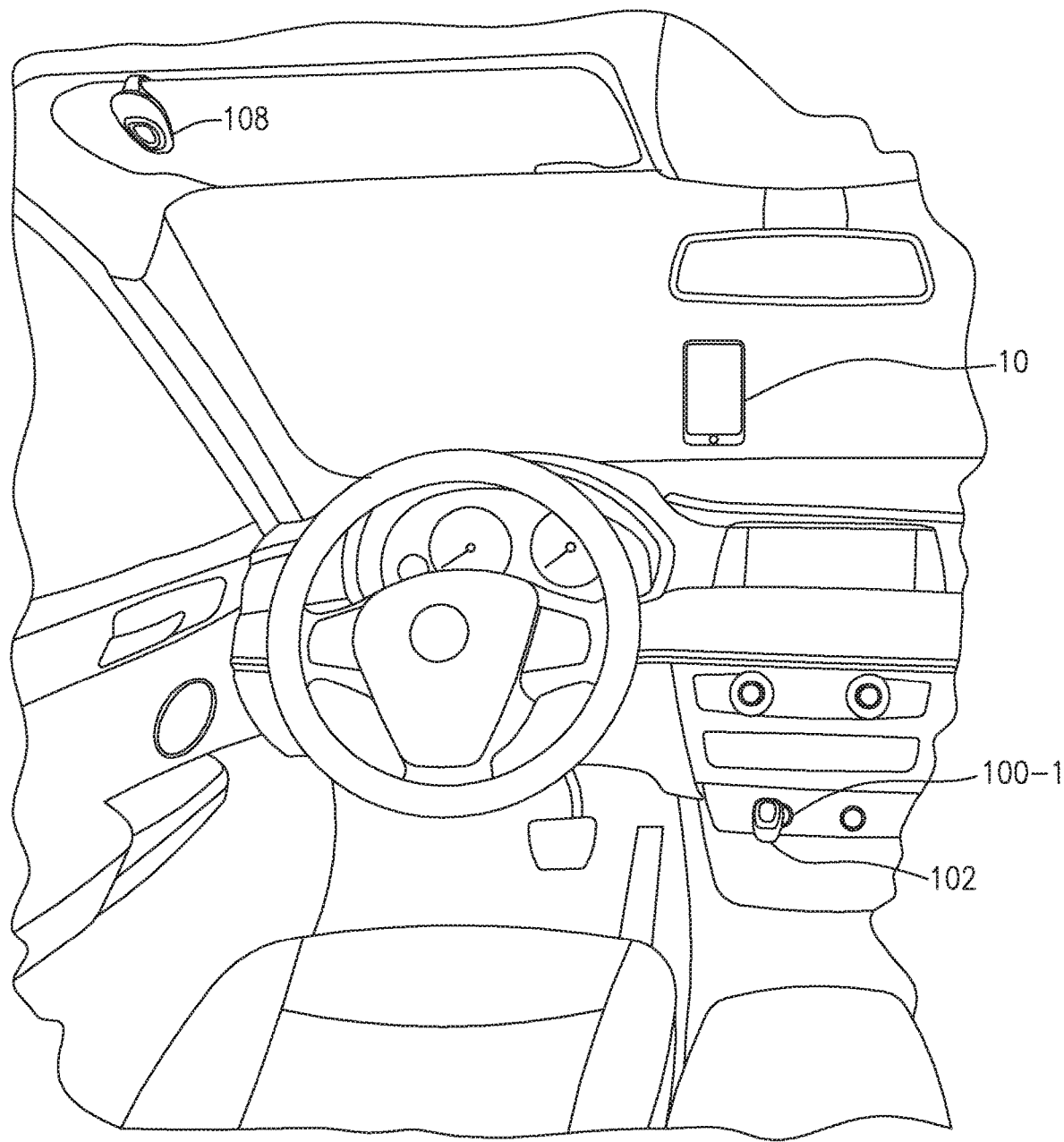
FIG. 1 is a diagram of an example environment for practicing of the present disclosure.

FIG. 1 illustrates an example environment 100 where a wireless adapter 102 of the present disclosure can be utilized. The environment 100 includes a vehicle, and specifically a dashboard or front area of a vehicle, including a console (or any other location in the cabin of the vehicle that includes a power interface, although some embodiments of the wireless adapter 102 include a battery such that continuous coupling with the vehicle power port is not required). The wireless adapter 102 is adapted to couple with a power port located anywhere in the vehicle. Examples of power ports include, but are not limited to USB ports, cigarette lighters, direct current (DC) ports, and so forth. In the example illustration of FIG. 1, the wireless adapter 102 is illustrated as interfacing with a cigarette lighter 100-1 of the vehicle.

In some embodiments, the wireless adapter 102 cooperatively communicates with a mobile device 106 to provide one or more emergency alerts or reporting features. The wireless adapter 102 can also communicatively couple and cooperatively function with an activator device 108. In some embodiments, the wireless adapter 102 can communicate with and/or be controlled in its operation by either or both the mobile device 106 and the activator device 108.

For example, a user can clip the activator device to their clothing, a seat belt, a visor, or any other suitable location. Unless the user also has a dock or holder for the mobile device 106, the mobile device 106 is subject to displacement if an incident occurs, such as when the vehicle is involved in an impact, if the vehicle rolls over, or if the vehicle is quickly decelerated. Since the activator device 108 is clipped or attached to any object, the likelihood of it being displaced in any of the aforementioned events is low. Thus, the user can utilize the activator device 108 in instances where the user cannot reach the wireless adapter 102 or the mobile device 106.

Thus, in situations where the user utilizes the wireless adapter 102, the mobile device 106, and activator device 108, these three devices cooperate to provide failsafe or redundant functionalities. When an emergency event occurs, if one of these devices is damaged, lost, or inaccessible, the remaining accessible and functioning devices can ensure that the emergency alert process is completed or can continue with minimal or no impact to any emergency alert/response processes.

Figure 2:
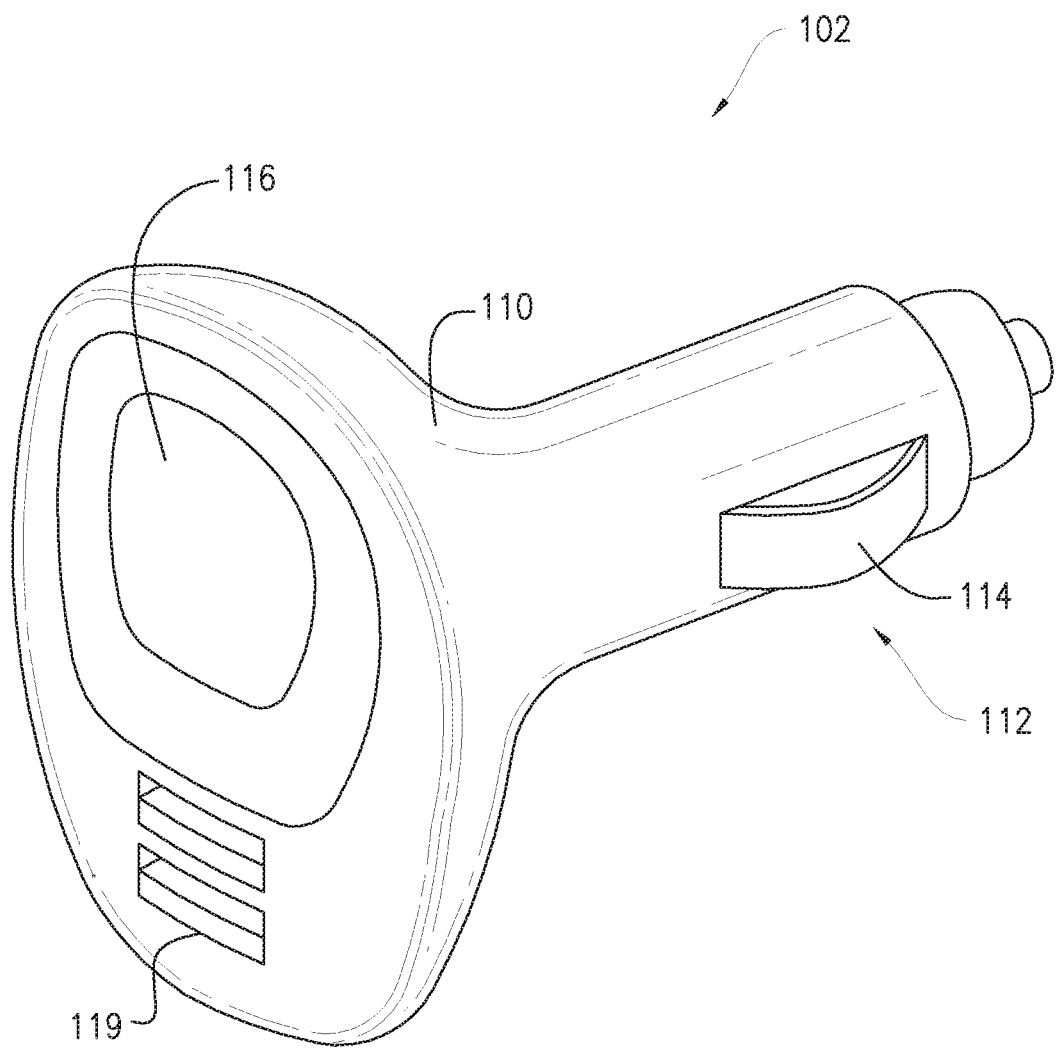
FIG. 2 illustrates an example wireless adapter, which was included in the example environment of FIG. 1.
Figure 3:
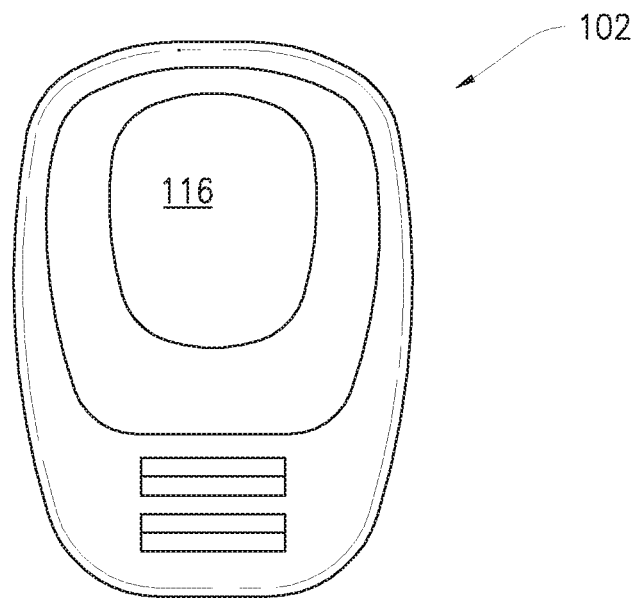
FIGS. 3 and 4 collectively illustrate additional views of the wireless adapter of FIG. 2.
Figure 4:
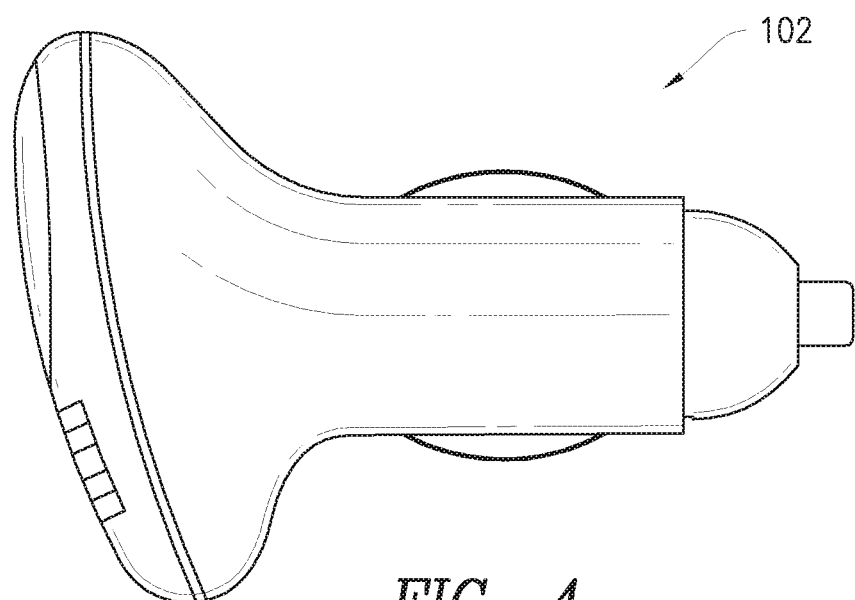

FIGS. 2-4 collectively illustrate various views of the wireless adapter 102. In one embodiment, the wireless adapter 102 comprises a housing 110. The housing 110 is configured to interface with one or more power ports of a vehicle. In this embodiment, the housing 110 includes an interface end 112 that is insertable into a DC power port such as a cigarette lighter. The interface end 112 comprises one or more contacts 114 that electrically couple the wireless adapter 102 to the vehicle in such a way that the wireless adapter 102 receives power from the vehicle.

In some embodiments, the wireless adapter 102 includes another type of power interface (such as the one or more contacts 114) that is electrically connectable to a cigarette lighter such that the components of the wireless adapter draw power from the vehicle. The wireless adapter 102 can also incorporate its own power such as a battery in the event that the vehicle loses its power.

In some embodiments, the wireless adapter 102 is affixed to a component of the vehicle, rather than coupling with a port or interface of the vehicle. In another embodiment, the wireless adapter 102 can interface with an OBD (On-Board Diagnostics) port of the vehicle. Thus, the wireless adapter 102 can receive and utilize signals received through the OBD port of the vehicle. These signals, such as speed and or other safety or operational signals regarding vehicle behavior or performance can be received by the wireless adapter 102 and utilized in combination with user depression of buttons on the wireless adapter 102 or motion/location signals that are sensed by the wireless adapter 102. These various combinations of signals can be utilized by the wireless adapter 102, mobile device 106, and/or an emergency response server 118 that receives data from the wireless adapter 102 and/or the mobile device 106, as will be described in greater detail below. The server 118 is illustrated in FIG. 6.

In some embodiments, an opposing terminal end of the wireless adapter 102 comprises an activator button 116 and one or more charging ports 119. The activator button 116 is generally utilized to activate an emergency response feature on any of the mobile device 106, the activator device 108, and/or the emergency response server 118. The user can depress the activator button 116 when an incident has occurred such as an accident, vehicle malfunction, or even when the user is scared or determines that they are in danger.

The charging ports 119 are provided to allow the user to indirectly charge another device, such as the mobile device 106 when the wireless adapter 102 is occupying the power port of the vehicle.

Figure 5:
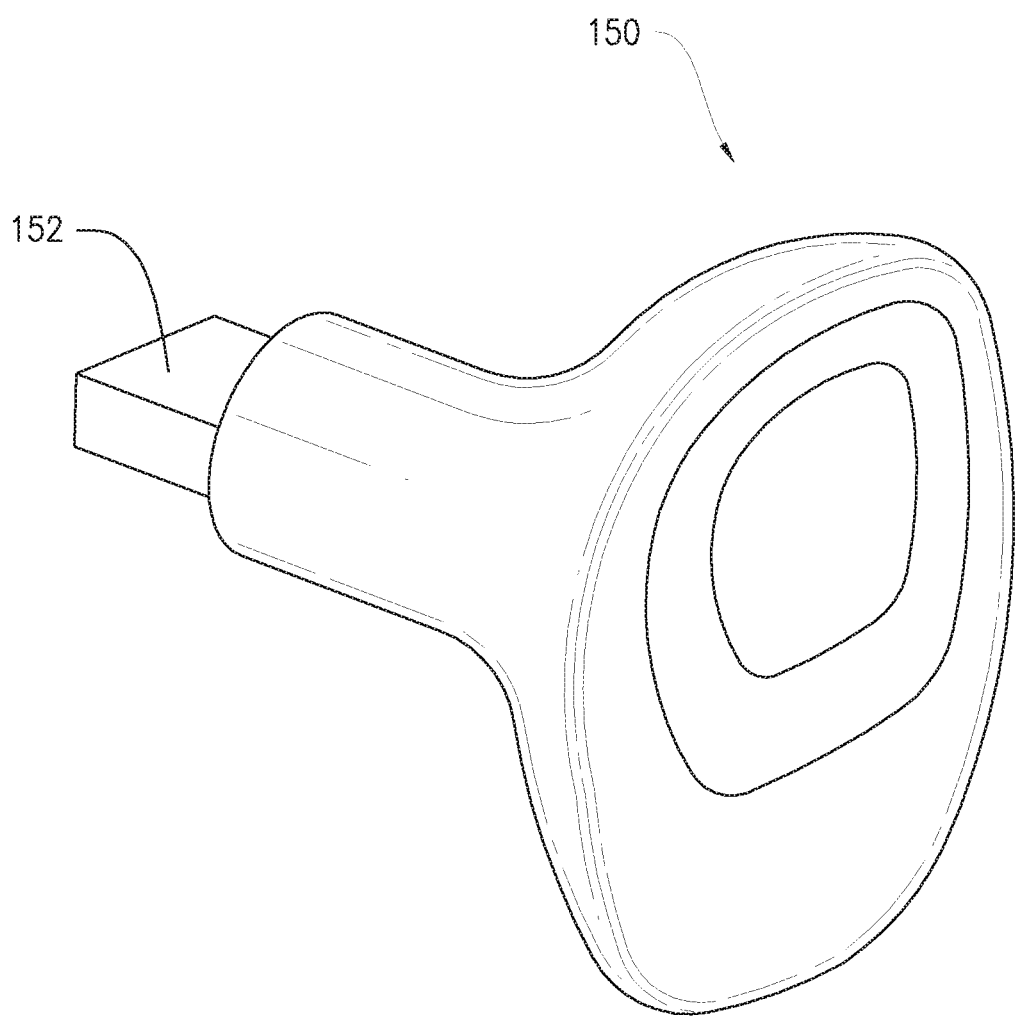
FIG. 5 is a perspective view of another example wireless adapter that comprises a USB key.

FIG. 5 illustrates another example wireless adapter 150 having a USB charging interface 152, rather than the contacts utilized in the embodiment of FIGS. 2-4. The wireless adapter 150 can be constructed otherwise similarly to the wireless adapter 102 of FIGS. 2-4.

It will be understood that the configuration of the wireless adapters illustrated in FIGS. 2-5 are merely example configurations with respect to their ornamental and aesthetics aspects.

Figure 6A:
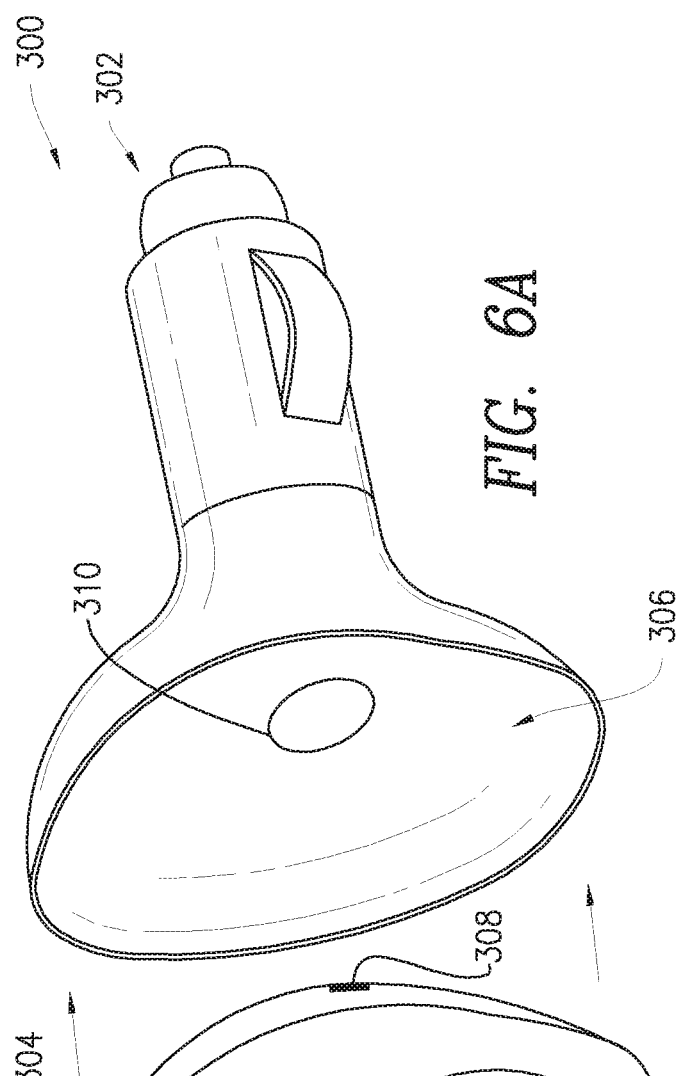
FIGS. 6A and 6B collectively illustrate an embodiment of the wireless adapter that includes a separable adapter that couples with a dock.
Figure 6B:
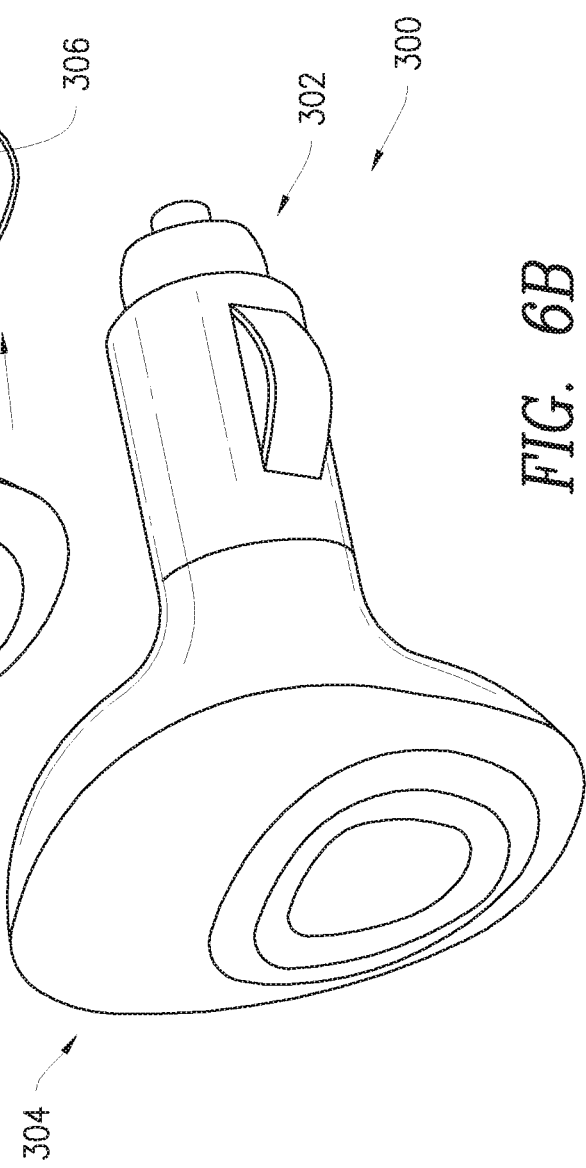

FIGS. 6A and 6B collectively illustrate another example wireless adapter 300 that includes a dock 302 and an activator 304. In some embodiments. The activator 304 can include any of the components of the wireless adapters and/or mobile devices described herein. The dock 302 provides a cradle portion 306 and a power/data coupling means 308 that electrically and/or communicatively couples the activator 304 with the vehicle. The activator 304 can include an interface 310 that cooperates power/data coupling means 308 of the dock 302.

When the activator 304 couples with the dock 302 (based on the coupling of interfaces 310, the activator 304 transitions to a fixed mode of operation. A fixed mode of operation includes all of the aforementioned modes of use related to the vehicle described herein. By way of example, the activator 304 can be configured (alone or in combination with the App of the mobile device) to sense movement and/or orientation when coupled with the dock 302.

When the activator 304 is removed from the dock the activator 304 can transition to a nomadic or mobile mode of operation, where the activator 304 is not sensing motion and/or orientation changes. The activator 304 can still sense location signals.

Figure 7:
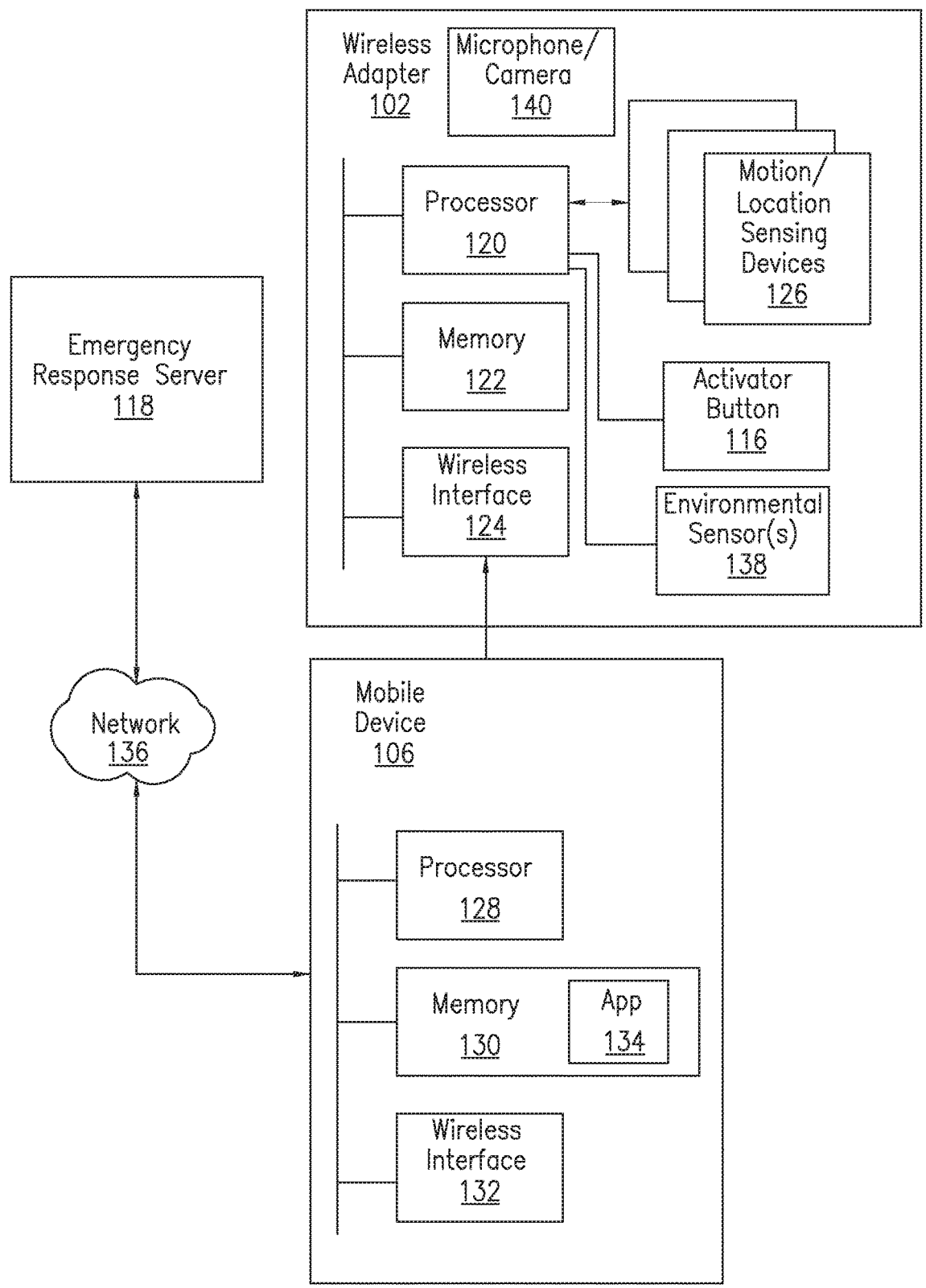
FIG. 7 is a schematic diagram of an example wireless adapter and a mobile device that can be used to practice aspects of the present disclosure.

FIG. 7 illustrates a schematic view of the wireless adapter 102 and the mobile device 106. For brevity and clarity, general components of the mobile device 106 are not illustrated. Example components of a computing system, such as the mobile device 106 are illustrated and described with reference to FIG. 7, are described in greater detail infra.

The wireless adapter 102 generally comprises a processor 120, memory 122, and a wireless interface 124. In some embodiments, the memory 122 is encoded with logic or instructions that cause the wireless adapter 102 to communicate with the mobile device 106 and/or the activator device 108 when a user depresses the activator button 116 (FIGS. 2-4), in some embodiments.

As will be described in greater detail below, the wireless adapter 102 is configured with logic that allows for communication with the mobile device 106 and/or the activator device 108 and activation of emergency responses on these devices that are based on various motion-based input sensed by various sensors incorporated into the wireless adapter 102, the mobile device 106, and/or the activator device 108.

The wireless interface 124 can function as a wireless transmitter and/or transceiver that allow the wireless adapter 102 to communicate with the mobile device 106, providing the various movement or force signals. In one embodiment, the wireless interface 124 can allow the wireless adapter 102 to communicate with the emergency response server 118, rather than using the mobile device 106 as a proxy or intermediate device to access the emergency response server 118.

In both instances, the wireless adapter 102 can communicate through the mobile device 106, but could also be equipped with its own wireless data network capabilities. Again, these communications modules could include Bluetooth, Bluetooth Low Energy, LTE, and WiFi—just to name a few.

Thus, the wireless adapter 102 can respond to physical input from a user depressing the activator button, from messages received from either the mobile device 106 or activator device 108, and/or from sensors incorporated into the wireless adapter 102.

Generally, the wireless adapter 102 is provided with a means for sensing motion, which when the wireless adapter 102 is coupled to the vehicle, directly includes sensing motion of the vehicle. Again, this could include, for example, an accelerometer or any other suitable motion, rotation, force, or other sensor.

In one embodiment, the wireless adapter 102 comprises one or more motion and/or location sensing devices 126 such as accelerometers, gyroscopes, compasses, GPS, and so forth. Motion signals generated by the sensing devices 126 can be produced from changes in acceleration, velocity, momentum, orientation, or other measurable changes in force.

In other embodiments, the wireless adapter 102 can leverage motion and/or location sensing devices associated with the mobile device 106. For example, the wireless adapter 102 can continuously (or periodically) receive motion and/or location signals from the mobile device 106. This leverage of resources can reduce the size of the wireless adapter 102 because the wireless adapter 102 does not need to account for the size of the sensors within the housing of the wireless adapter 102.

The activator device 108 can include any one or more of the components described above with respect to the wireless adapter 102, with the exception that the activator device 108 can be placed in another portion the vehicle for additional access if the wireless adapter 102 is disabled or inaccessible.

The mobile device 106 generally comprises a processor 128, memory 130, and a wireless interface 132. The memory 130 is encoded with logic or instructions that cause the mobile device 106 to communicate with the wireless adapter 102 and/or the activator device 108 during an emergency event or other incident.

In some embodiments, the mobile device 106 is configured with an application "App 134" that receives the motion signals from the wireless adapter 102 and, through various algorithms that utilize acceleration, velocity, or other motion or location signals, determines if the vehicle has been involved in an emergency incident. For example, an emergency incident could include the vehicle being in a single or multicar accident. In another example, the vehicle could be involved in a roll over accident. In yet another example, the vehicle could be stationary, but located on a busy highway, indicating that the vehicle is stranded. Each of these events is measurable in terms of motion and/or location sensing.

In another embodiment, the App 134 can engage a predetermined emergency response when it receives an activation signal from the wireless adapter 102. For example, a user depresses the activator button 116 of the wireless adapter 102 when an emergency event occurs. The App 134 determines that the activation signal has been received and the App 134 then executes a predetermined emergency response routine.

In one embodiment, the emergency response routine that is selected is based not only on the activation signal but also any motion and/or location signals received from the wireless adapter 102. By way of example, the App 134 determines that the activation signal has been received and then receives a message packet that comprises sensor information. The App 134 can utilize these various types of information to select an emergency response routine. For example, if the motion signal is indicative of an impact and the vehicle is near a location where a trusted contact lives, the App 134 can selectively contact the trusted contact first, rather than contacts that may live further from the vehicle.

As mentioned above the wireless adapter 102 and mobile device 106 (as well as the activator device 108) can communicate with one another using any suitable wireless protocol such as Bluetooth, near field communications, infrared, and so forth. Also, the wireless adapter 102 and mobile device 106 can form (or join) an ad hoc WiFi network using an access point generated by the vehicle. To be sure, some vehicles are adapted with a wireless access point that allows users inside the vehicle to use a wireless network within the vehicle. The wireless adapter and mobile device can communicate over this type of WiFi network.

As mentioned above, the wireless adapter 102, in some embodiments, is configured to interface with a cigarette lighter or other port/interface for the vehicle. The wireless adapter fits into the port/interface in such a way that the wireless adapter remains in fixed relationship to the vehicle, meaning that the wireless adapter is not free to move relative to the vehicle. Thus, it can be inferred that movement of the wireless adapter is directly representative of movement of the vehicle.

Turning now to the mobile device 106, in some embodiments, the mobile device 106, through use of the App 134, is configured to receive the motion signals from the wireless adapter and determine if an emergency incident or event has occurred. The mobile device 106 can maintain in memory a set of triggering criteria that are indicative of an emergency event. Once an emergency event is detected, the mobile device 106 can instantiate one or more emergency procedures. In some embodiments, these triggering criteria can link to one or more emergency procedures. The type of emergency procedures executed is based on event type, in some embodiments. For example, an emergency event of a roll over crash will produce an example emergency response of transmitting an alert message that indicates that the vehicle was in a roll over crash. If the emergency event includes a high speed impact crash with a detection of smoke in the vehicle, the alert message may include not only an indication that the car wreck has occurred, but also indicate that the vehicle is potentially on fire and thus fire and rescue is needed.

With respect to triggering criteria, the mobile device maintains a threshold set (or a single threshold) of acceleration rates that are indicative of a vehicle crash. For example, if the vehicle experiences deceleration in excess of two "g-forces". This is merely an example of how motion signals can be interpreted as a vehicle crash.

In another example, triggering criteria can include rapid changes or deltas in acceleration. In another example, triggering criteria could include a change in orientation occurring from a rollover or flipping event.

In another example, the triggering criteria could include an indication that the vehicle is not moving, but a location of the vehicle indicates that traffic is moving at a steady pace, or that the vehicle is on a highway. Thus, in some embodiments, the mobile device not only monitors and evaluates motion signals from the wireless adapter 102, but also from third party traffic resources. Therefore, the mobile device 106 is configured to monitor the specific location of the wireless adapter 102 using GPS information gathered by a GPS sensor in the wireless adapter 102 or the GPS sensor in the mobile device 106 (assuming that the wireless adapter and mobile device are proximate to one another).

After sensing the occurrence of a triggering event, the mobile device 106 is configured to execute one or more emergency response routines. Again, these routines can be tied back to an emergency type. For example, in one embodiment, an emergency response routine includes the mobile device establishing a call with one or more emergency responders such as police or fire.

In another example, the mobile device maintains a list of trusted contacts that are each communicated with when the emergency event is detected. The mobile device 106 can call individuals on the list of trusted contacts, attempting to make contact with an individual. If the mobile device 106 senses that a contact is not picking up, either by not answering or encountering a voicemail prompt, the mobile device 106 can hang up and dial the next individual on the list.

In some embodiments, the list can be ranked in any order. Also, the calling of an individual can occur not only through use of a cellular communications network, but also using, for example, VoIP programs that can be executed on the mobile device. In some embodiments, entities on the list can be messaged using email, SMS, MMS, or other communication protocols that would be known to one of ordinary skill in the art.

In another embodiment, an emergency response routine includes the mobile device 106 activating a camera, microphone, or other I/O device of the mobile device 106. This allows the mobile device 106 to capture images, audio, video, or other similar types of data from inside/outside the vehicle. For example, the microphone can be turned on for continuous recording, as well as the camera of the mobile device 106.

In some embodiments, the captured I/O can be transmitted to emergency responders, individuals on the trusted contact list, as well as broadcast to, for example, a social network, webpage, or other online resource. This can occur in combination with the emergency response server 118, as discussed below.

In some embodiments, the mobile device 106 can couple with the computer of the vehicle to cause the vehicle to shut off its ignition, activate hazard lights, shutoff the fuel pump, or execute other similar safety procedures. These features can be enhanced when the wireless adapter 102 couples with an OBD port of the vehicle.

Because the mobile device 106 is receiving motion signals from the wireless adapter 102 over time (in some embodiments), the mobile device 106 can be used to record such information and generate reports about the motion and/or location of the vehicle over time. This information can be used to deduce or infer information about an accident, confirming or falsifying claims about whether the vehicle was speeding or when a crash actually occurred, as well as when a user applied breaking to slow down the vehicle. For example, motion signals can be time stamped by the processor of the wireless adapter 102 to establish exactly (or substantially close) when a vehicle began to accelerate, decelerate, or have a change in its orientation.

According to some embodiments, the wireless adapter 102 can be configured to monitor usage of the mobile device 106. For example, the wireless adapter 102 can be configured to sense the receipt or transmission of a cellular telephone call by the mobile device, as well as a SMS or MMS message receipt or transmission.

The wireless adapter 102 can be configured to record these events and time-stamp them. Also, the wireless adapter 102 can be configured to transmit an alert to a third party with the time stamped event data. Thus, in some embodiments, the wireless adapter 102 comprises a wireless or wired interface that can be used to transfer event data to a connected computing device. For example, the wireless adapter 102 can be configured to couple with an access point in a house and upload its event data each time the vehicle is in proximity to the house.

In some embodiments, a system includes not only the wireless adapter 102 and mobile device described above, but also the emergency response server 118 that is configured to couple with the wireless adapter 102, the mobile device 106, and/or the activator device 108.

The emergency response server 118 can be configured to provide one or more of the functionalities described above with respect to the mobile device 106. In some embodiments, the emergency response server 118 receives motion signals from the mobile device 106 and/or the wireless adapter 102 and the emergency response server 118 determines if an emergency event has occurred. The emergency response server 118 can also cause the mobile device 106 to undertake various emergency response operations as described above. Thus, the mobile device 106 does not require the App 134 in some embodiments.

The emergency response server 118 may communicatively couple with the mobile device 106 and/or the wireless adapter 102 via a public or private network. Suitable networks 136 may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In an alternative embodiment, a wireless adapter 102 can comprise an accelerometer to detect crashes, a gyroscope to detect rollovers, and gas detectors to detect any or all of the following: carbon monoxide, natural gas (for vehicles power by natural gas), and/or hydrogen (for fuel cell vehicles). In addition the wireless adapter 102 comprise two addition sensors to detect smoke/fire (an ionizing sensor and a photoelectric sensor). These additional sensors will be referred to as environment sensors 138. In another example, the wireless adapter 102 can include a barometer or water sensor that can sense if the vehicle is under water. Also, the housing of the wireless adapter 102 can be made so as to be waterproof.

A variation of this wireless adapter 102 could be used in rental cars as a non-removable device and a downloadable data log. This offers an optional protection service for renters, and additionally, the smoke detector could be made sensitive enough to detect if someone is smoking in the car, which is banned on most contracts. A smoking clean-up fee could then be assessed based upon actually detecting an occurrence.

In another example, the wireless adapter 102 can also comprise its own microphone/speaker/camera 140 that can receive/output audio data. The wireless adapter 102 can stream the audio data to the emergency response server 118, rather than using the mobile device 106. For example, if the user is in distress, the speaker 138 can capture the speech of the user and transmit the same to the server. In other embodiments, the wireless adapter 102 can utilize the microphone, speaker, and/or camera of the mobile device 106.

With respect to audio output, the wireless adapter 102 can use the speaker 138 to broadcast messages to the user. For example, the mobile device 106 can transmit warning messages to the wireless adapter 102, such as traffic warnings, which are output from the speaker of the wireless adapter 102.

Figure 8:
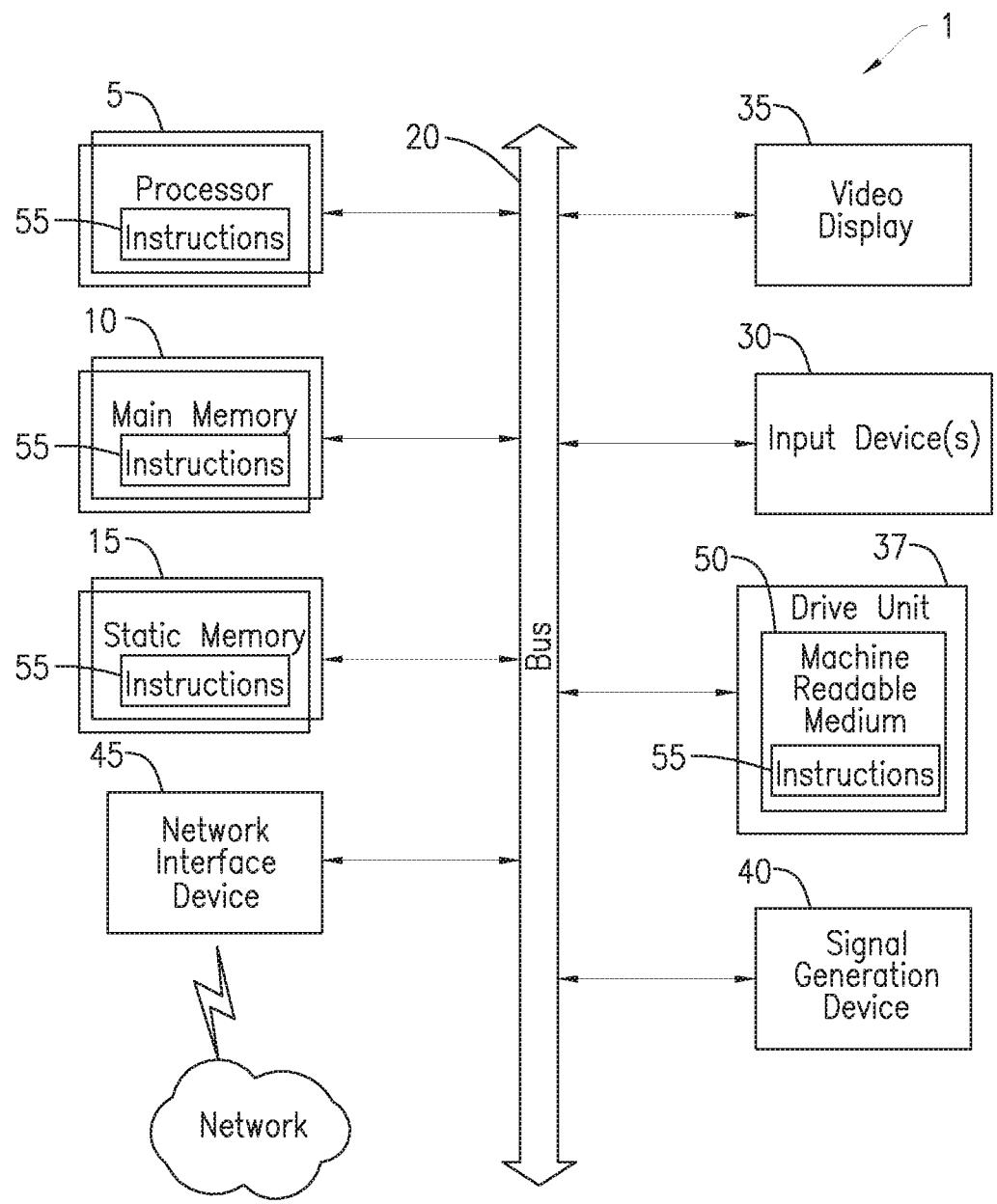
FIG. 8 illustrates an exemplary computing system that may be used to implement embodiments according to the present disclosure.

FIG. 8 is a diagrammatic representation of an example machine in the form of a computing system 1, within which a set of instructions for causing the machine to perform any one or more of the methodologies discussed herein may be executed. The system 1 of FIG. 8 may be implemented in the contexts of the likes of the wireless adapter, the mobile device, and/or the server described herein.

In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1 includes a processor or multiple processors 5 (e.g., a central processing unit (CPU), a graphics processing unit (GPU), or both), and a main memory 10 and static memory 15, which communicate with each other via a bus 20. The computing system 1 may further include a video display 35 (e.g., a liquid crystal display (LCD)). The computing system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computing system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computing system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing systems that are coupled to the Internet service, and that the computing systems may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

The invention claimed is:

1. A wireless adapter, comprising:
   a housing configured to couple with a power port of a vehicle, the housing comprising:
   a wireless interface;
   a motion sensor that senses at least one of velocity, acceleration, and orientation;
   a microphone;
   a processor; and
   a memory that stores logic that is executed by the processor to:
   receive motion signals from the motion sensor;
   transmit the motion signals on the wireless interface to an emergency response server that is communicatively coupled with the wireless adapter; and
   activate the microphone when the motion signals indicate that an emergency event has occurred.

2. The wireless adapter according to claim 1, wherein the logic is further executed by the processor to: compare the motion signals to triggering criteria, when the motion signals match at least one of triggering criteria an emergency response procedure is activated.

3. The wireless adapter according to claim 2, wherein the emergency response procedure is executed by the wireless adapter.

4. The wireless adapter according to claim 2, wherein the emergency response procedure is executed by a mobile device.

5. The wireless adapter according to claim 2, wherein the triggering criteria comprise motion thresholds that define acceleration thresholds, orientation thresholds, rapid differential changes in motion signals that are indicative of the vehicle being involved in an impact or rollover event.

6. The wireless adapter according to claim 1, further comprising one or more environmental sensors that detect smoke, fire, barometric pressure, water, or combinations thereof.

7. The wireless adapter according to claim 1, further comprising an activator button, wherein the logic is further executed by the processor to:
   activate the microphone when the activator button is depressed;
   execute an emergency response procedure that includes transmission of an emergency alert message to a trusted contact or emergency responder.

8. The wireless adapter according to claim 7, wherein the logic is further executed by the processor to activate a camera of a mobile device when the motion signals indicate that an emergency event has occurred.

9. The wireless adapter according to claim 1, wherein the logic is further executed by the processor to cause the vehicle to any of shut off an ignition of the vehicle, activate hazard lights of the vehicle, and shutoff a fuel pump of the vehicle when the motion signals indicate that an emergency event has occurred.

10. The wireless adapter according to claim 1, wherein the logic is further executed by the processor to, through the wireless interface, sense receipt or transmission of a cellular telephone call by a mobile device, as well as a SMS or MMS message receipt or transmission by the mobile device.

11. The wireless adapter according to claim 10, wherein the wireless adapter generates and stores a log of the cellular telephone call and the SMS or MMS messages.

12. A wireless adapter, comprising:
a housing configured to couple with a power port of a vehicle, the housing comprising:
   a wireless interface;
   a motion sensor that senses at least one of velocity, acceleration, and orientation;
   a microphone;
   a camera;
   a processor; and
   a memory that stores logic that is executed by the processor to:
      receive motion signals from the motion sensor;
      transmit the motion signals on the wireless interface to an emergency response server that is communicatively coupled with the wireless adapter;
      activate at least one of the camera or the microphone when the motion signals indicate that an emergency event has occurred; and
      transmit data gathered from at least one of the camera or the microphone to the emergency response server.

13. A wireless adapter, comprising:
a housing configured to couple with a power port of a vehicle, the housing comprising:
   a wireless interface;
   a motion sensor that senses at least one of velocity, acceleration, and orientation;
   a microphone;
   a processor; and
   a memory that stores logic that is executed by the processor to:
      receive motion signals from the motion sensor; and
      determine that an emergency event has occurred based on processing of the motion signals; and
      activate the microphone when the motion signals indicate that an emergency event has occurred.

* * * * *